United States Patent
Imoto

(10) Patent No.: US 7,545,712 B2
(45) Date of Patent: Jun. 9, 2009

(54) OPTICAL DISK REPRODUCING APPARATUS AND OPTICAL DISK REPRODUCING METHOD

(75) Inventor: Yoshinobu Imoto, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 730 days.

(21) Appl. No.: 10/900,326

(22) Filed: Jul. 28, 2004

(65) Prior Publication Data

US 2005/0025020 A1   Feb. 3, 2005

(30) Foreign Application Priority Data

Jul. 29, 2003   (JP)   ............ P. 2003-202781

(51) Int. Cl.
G11B 7/00   (2006.01)

(52) U.S. Cl. .................. 369/47.32; 369/94

(58) Field of Classification Search ........... 369/47.1, 369/53.2, 53.22, 47.27, 275.3, 94, 44.26, 369/47.33, 53.1, 47.32

See application file for complete search history.

(56) References Cited

U.S. PATENT DOCUMENTS 6,275,457 B1 * 8/2001 Maeda .............. 369/47.21
6,370,090 B1 * 4/2002 Verbakel et al. .......... 369/30.04
6,469,965 B1 * 10/2002 Horita .................. 369/53.2
6,628,591 B1 * 9/2003 Yokota et al. ........... 369/53.21
6,954,412 B1 * 10/2005 Sako ..................... 369/53.2
7,028,152 B2 * 4/2006 Deoka et al. ............ 711/158

FOREIGN PATENT DOCUMENTS

JP   A-11-296861   10/1999
JP   2000-251383   9/2000

* cited by examiner

*Primary Examiner*—Nabil Z Hindi
(74) *Attorney, Agent, or Firm*—Morgan, Lewis & Bockius LLP

(57) ABSTRACT

An optical disk reproducing apparatus configured to reproduce an optical disk of a hybrid type having CD and HD layers, including a system controller. Preferably, the system controller includes a disk discriminating unit which discriminates a loaded optical disk, an access list acquisition unit which obtains first access list information, a reproduction information setting unit which sets reproduction information when a reproduction area change request is issued, a reproduction request determining unit which determines whether or not a reproduction request is issued after the reproduction information is set, an access list request unit which requests second access list information when the reproduction request is issued, and a reproduction control unit which obtains the second access list information, when the second access list information is required, replaces the first access list information by the second access list information, and starts reproduction.

11 Claims, 3 Drawing Sheets

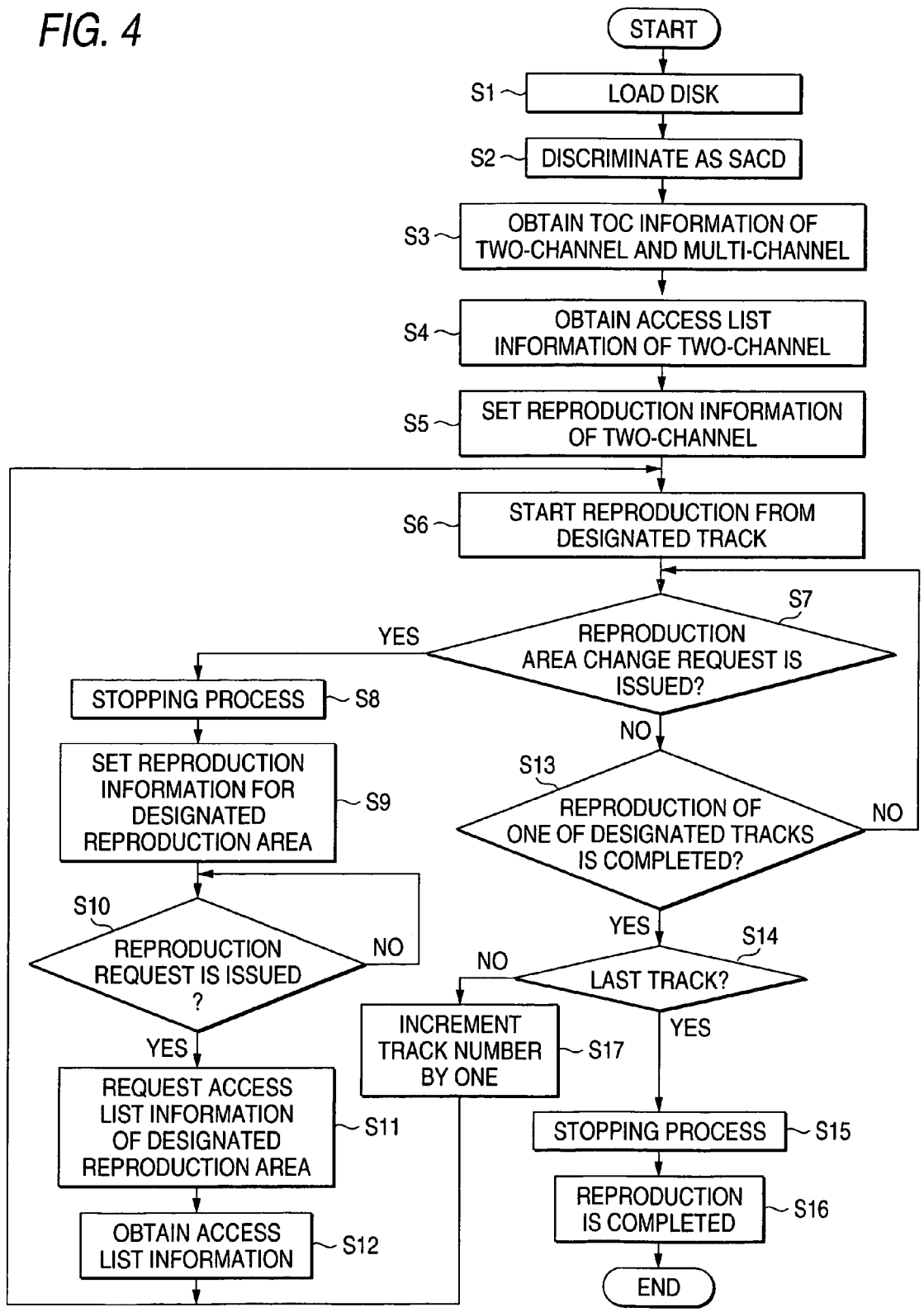

OPTICAL DISK REPRODUCING APPARATUS AND OPTICAL DISK REPRODUCING METHOD

BACKGROUND OF THE INVENTION

1. Field of the Invention

The present invention relates to an optical disk reproducing apparatus for reproducing information recorded on an optical disk and, in particular, relates to an optical disk reproducing apparatus also capable of reproducing information recorded on an optical disk of a hybrid type formed by a CD (Compact Disc) layer and an HD (Hi-Definition) layer.

2. Description of the Related Art

In recent years, a DVD (Digital Versatile Disc) which is a new optical disk having a larger capacity than a CD has been spread. In the DVD, information is recorded on an optical disk having a diameter of 12 cm at a track pitch of 0.8 μm which is a half of the track pitch of 1.6 μm employed in the conventional CD, the wavelength of a semiconductor laser is changed from 780 nm for the CD to 630 nm for the DVD, and the EFM (Eight-to-Fourteen Modulation) adopted for the CD is improved to consequently realize high-density recording which corresponds to information of approximately 4 G bytes on one side of the disk. In such a DVD, an optical disk of a hybrid type having two layers as recording layers has been spread.

When such an optical disk of a hybrid type is an SACD (Super Audio CD), a 16-bit digital audio signal sampled at a frequency of 44.1 kHz, for example, is recorded on one of the layers, that is, a CD layer, while a 1-bit digital audio signal being processed through the SIGMA DELTA modulation at a frequency of 2.842 MHz, for example is recorded on the other layer, that is, an HD layer. The HD layer is divided or partitioned into a two-channel area and a multi-channel area.

In the conventional optical disk reproducing apparatus also capable of reproducing information of such an SACD, when reproducing an SACD, at first an audio signal on the two-channel area of the HD layer is reproduced, then an audio signal on the multi-channel area of the HD layer is reproduced, and thereafter an audio signal on the CD layer is reproduced. That is, the specification for changing the reproducing area based on operations of keys is arranged to change the reproducing areas in an order of a two-channel area of the HD layer, a multi-channel area of the HD layer and an area of the CD layer.

At the time of reproducing information from an SACD, access list information of TOC (Table Of Contents) is required when converting time information into address information. The time information is information contained in the TOC information and represents a reproduction start time and a reproduction time period for each track. The address information is information contained in the TOC information and represents a reproduction start address and a reproduction sector number for each track. The access list information has different information for each of the two-channel and the multi-channel. The information for each of the two-channel and the multi-channel amounts to 65 K bytes.

For example, when three frames are constituted by fourteen sectors in the Direct Stream digital (DSD) format, based on the access list information, the conversion from the time information to the address information is attained in accordance with an expression of "address =(time information× 14)/3". Further, when three frames are constituted by sixteen sectors in the DSD format, based on the access list information, the conversion from the time information to the address information is attained in accordance with an expression of "address =(time information×16)/3". In the Direct Stream Transfer (DST) format (flexible format), as the aforesaid expressions cannot be used, the access list is required.

SUMMARY OF THE INVENTION

In the case of changing the reproduction area of an SACD in the conventional optical disk reproducing apparatus, there arises the following problems when the reproduction area is desired to be changed from the two-channel area to the multi-channel area of the HD layer, for example.

That is, at the time of reproducing information from an SACD, the access list information of the two-channel of the HD layer is stored in a memory to enable the reproduction of the two-channel area. In this case, when a reproduction area change request is issued, the access list information of the multi-channel of the HD layer is further stored in the memory, whereby the multi-channel area of the HD layer is reproduced. However, since the access list information of the two-channel and the access list information of the multi-channel are stored in the memory, the information of twice 65 K bytes, that is, 130 K bytes, for example, occupies an area of the memory, whereby there arises a problem that the efficiency of the memory is degraded.

Also, in the case of changing the reproduction area from the two-channel area of the HD layer to the area of the CD layer, the reproduction area is changed to the area of the CD layer through the changing operation to the multi-channel of the HD layer. In this case, also, since the access list information of the two-channel and the access list information of the multi-channel are stored in the memory, the information of 130 K bytes occupies an area of the memory, whereby there arises a problem that the efficiency of the memory is degraded.

Further, in each of the cases of changing the reproduction area from the two-channel area to the multi-channel area of the HD layer and changing the reproduction area from the two-channel area of the HD layer to the area of the CD layer, a process of obtaining the access list information from an SACD is required each time the reproduction area change request is issued. Thus, a surplus processing time due to the obtaining process is required, and so there arises a problem that much time is required for changing the reproduction area.

The conventional technique of JP-A-11-296861 is arranged so that, at the time of reproducing a multi-layer disk (optical disk of a hybrid type), a user can reproduce a desired layer and recognize a layer being reproduced. However, according to the conventional technique, since there is no disclosure about the aforesaid processing of the access list information, the aforesaid problems can not be solved.

The invention has been made in order to solve the aforesaid problems and an object of the invention is to provide an optical disk reproducing apparatus which can reduce an amount of a memory area for storing access list information and reduce a time period required for changing reproduction areas.

In order to attain the aforesaid object, according to an aspect of the present invention, an optical disk reproducing apparatus configured to reproduce an optical disk includes a system controller. Preferably, the optical disk includes an optical disk of a hybrid type, which has a first layer and a second layer, the first layer is a Compact Disc layer containing a first digital signal, the second layer is a Hi-Definition layer in which a second digital signal and a third digital signal are recorded respectively in a first recording area and a second recording area, the first and second recording areas being partitioned in advance, the first digital signal is a multi-bit digital signal quantized at a first sampling frequency, and the second and third digital signals are 1-bit digital signals of two-channel and multi-channel, respectively, quantized at a second sampling frequency, which is higher than the first sampling frequency. Preferably, the system controller includes a disk discriminating unit which discriminates an optical disk having been loaded, an access list acquisition unit which obtains the first access list information on the first reproduction area when the optical disk loaded is discriminated as an optical disk of a hybrid type, a reproduction information setting unit which sets reproduction information necessary for reproduction with respect to the second reproduction area when a reproduction area change request is issued, a reproduction request determining unit which determines whether or not a reproduction request is issued after the reproduction information is set with respect to the second reproduction area, an access list request unit which requests the second access list information on the second reproduction area when the reproduction request is issued, and a reproduction control unit which obtains the second access list information, when the second access list information is required, replaces the first access list information by the second access list information, and starts reproduction of the second reproduction area.

In such a configuration, when an optical disk having been loaded is discriminated as an optical disk of a hybrid type by the disk discriminating unit, the access list acquisition unit obtains the access list information of two-channel of the HD layer to be reproduced. When the reproduction area change request is issued, reproduction information necessary for reproduction is set for the designated reproduction area by the reproduction information setting unit. Thereafter, when the reproduction request determining unit determines that a reproduction request is issued, the access list request unit requests the access list information of a designated reproduction area. Then, when the access list information of the designated reproduction area is required, the reproduction control unit obtains the access list information of the designated reproduction area to replace the access list information of the two-channel by the access list information of the designated reproduction area thus obtained to start the reproduction of the designated reproduction area.

According to such a configuration, the access list information is not obtained when the reproduction area change request is issued, but the access list information is obtained when the reproduction request is issued thereafter. Thus, an amount of a memory area for storing the access list information can be reduced and a time period required for changing reproduction areas can be reduced.

According to another aspect of the present invention, an optical disk reproducing apparatus configured to reproduce an optical disk includes a system controller. Preferably, the optical disk includes an optical disk of a hybrid type, which has a first layer and a second layer. Preferably, the system controller obtains first access list information on a first reproduction area, when a reproduction area change request is issued and a reproduction request is issued, obtains a second access list information on a second reproduction area designated by the reproduction request, in place of the first access list information, and starts reproduction of the second reproduction area.

In such a configuration, at first, the access list information of only an area to be reproduced is obtained. Then, when the reproduction area change request is issued and then the reproduction request is issued, the access list information of a reproduction area designated by the reproduction request is obtained in place of the access list information of only the area, and thereafter the reproduction of the designated reproduction area is started.

According to such a configuration, the access list information is not obtained when the reproduction area change request is issued, but the access list information is obtained when the reproduction request is issued thereafter. Thus, an amount of a memory area for storing the access list information can be reduced and a time period required for changing reproduction areas can be reduced.

According to yet another aspect of the present invention, an optical disk reproducing method including obtaining first access list information on a first reproduction area, obtaining a second access list information on a second reproduction area designated by a reproduction request, when a reproduction area change request is issued and the reproduction request is issued, in place of the first access list information, and starting reproduction of the second reproduction area.

BRIEF DESCRIPTION OF THE DRAWINGS

Preferred embodiment of the present invention will be described in detail based on the following figures, wherein:

FIG. 4 is a flow chart for explaining the operation of the reproduction area change process which is the feature of the optical disk reproducing apparatus according to the embodiment.

DETAILED DESCRIPTION OF THE INVENTION

Figure 1:
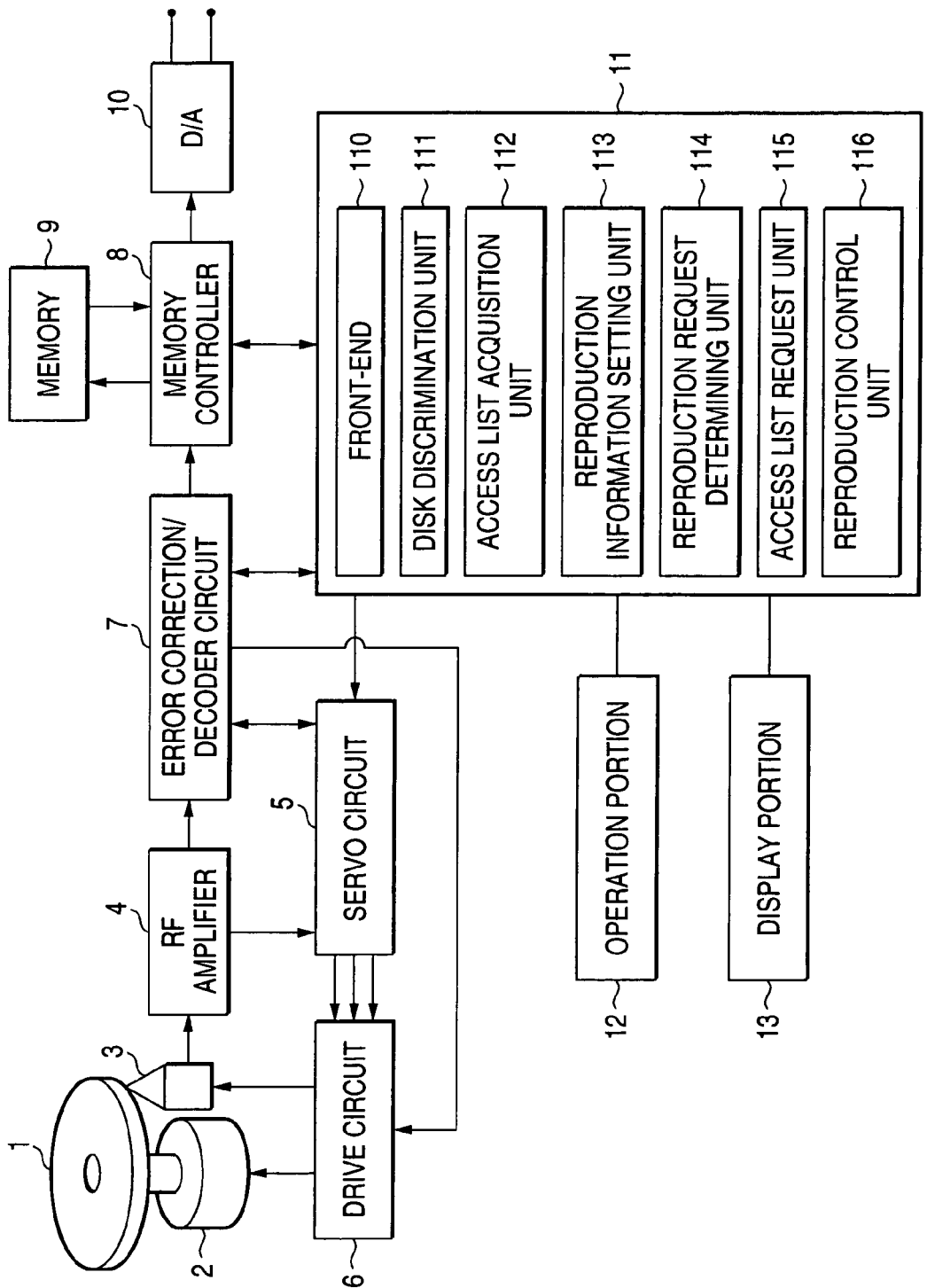
FIG. 1 is a block diagram showing the configuration of the optical disk reproducing apparatus according to an embodiment of the invention.

An embodiment of the invention will be explained with reference to the accompanying drawings. FIG. 1 is a block diagram showing the configuration of the optical disk reproducing apparatus according to the embodiment of the invention. The optical disk reproducing apparatus includes an optical pickup 3, an RF (radio frequency) amplifier 4, an error correction/decoder circuit 7, a memory controller 8, a buffer memory 9, a D/A (digital-to-analog) conversion circuit 10, a system controller 11, a servo circuit 5, a drive circuit 6, a spindle motor 2, an operation portion 12 and a display portion 13.

Figure 2:
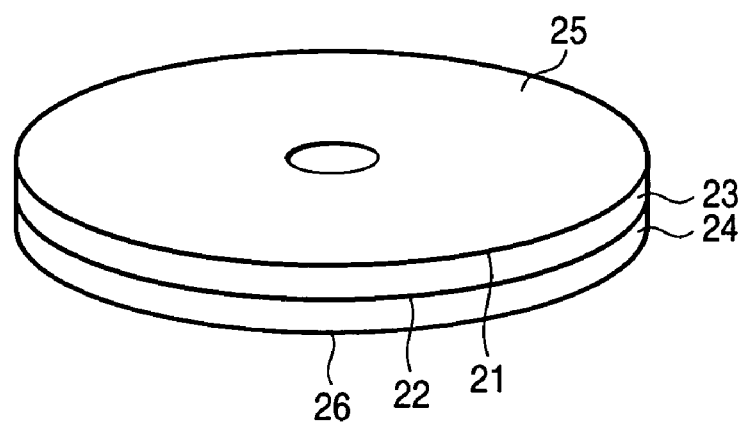
FIG. 2 is a diagram for explaining the structure of an SACD which is an optical disk of a hybrid type in the embodiment.

The optical pickup 3 is configured by not-shown components including objective lenses, a biaxial mechanism, semiconductor lasers and a light receiving unit for receiving light which is emitted from the semiconductor laser and reflected by the surface of the optical disk 1. In the case where the optical disk 1 placed on the not-shown turntable of the optical disk reproducing apparatus is an SACD (Super Audio Compact Disc) having the hybrid structure as shown in FIG. 2, the optical path is selectively switched so that the semiconductor laser emitting an output wavelength of 780 nm is used for reproducing the CD layer of the disk, and another semiconductor laser emitting a shorter output wavelength of 680 nm is used for reproducing the HD layer of the disk.

The optical pickup 3 is provided with two objective lenses. The optical path is selectively switched so that one of these objective lens having a numerical aperture of 0.45 is used for reproducing the CD layer, and the other objective lens having a numerical aperture of 0.6 is used for reproducing the HD layer. When an optical disk loaded into the optical disk reproducing apparatus is a CD, the operation for reproducing the CD layer of the optical disk of a hybrid type is performed.

When a hologram-integrated type aspherical lens is used, it is not necessary to provide two objective lenses inside the optical pickup 3 as mentioned, and merely a single lens is sufficient to meet the requirement with selective switching of the optical path of the semiconductor laser. Therefore, an optical pickup having such a configuration may be used.

The biaxial mechanism of the optical pickup 3 includes a focus coil for driving the objective lens toward or away from the optical disk 1, and a tracking coil for driving the objective lens in the radial direction of the optical disk 1. The optical disk reproducing apparatus is provided with a sled motor (not shown) for widely moving the whole optical pickup 3 in the radial direction of the optical disk 1.

The reflected light detected by the photo sensor inside the optical pickup 3 is supplied the RF amplifier 4, which then executes a current-to-voltage conversion and a matrix calculation to generate a focus error signal, a tracking error signal, and also an RF signal as reproduced information.

The focus error signal and the tracking error signal thus generated are applied to the above-mentioned focus coil and the tracking coil, respectively, through the drive circuit 6 after being subjected to phase compensation and gain control in the servo circuit 5. Further the tracking error signal is processed through a low pass filter in the servo circuit 5, whereby a sled error signal is generated and then is applied through the drive circuit 6 to the not-shown sled motor.

When the loaded optical disk 1 is a CD, the RF signal generated in the RF amplifier 4 is binary-coded with execution of EFD (eight-to-fourteen demodulation) and is processed for error correction through CIRC (cross interleave Reed-Solomon coding) in the error correction/decoder circuit 7, and subsequently the processed signal is supplied to the memory controller 8.

Meanwhile, when the loaded optical disk 1 on the turntable is an optical disk of a hybrid type, the reproduction of its CD layer is performed in the same manner as in the foregoing case of a CD, i.e., the signal is binary-coded with execution of the EFD and is processed for error correction through the CIRC in the error correction/decoder circuit 7, and then the processed signal is supplied to the memory controller 8.

When reproducing the HD layer of an optical disk of a hybrid type, the signal is binary coded with execution of EFD-plus (eight-to-fourteen demodulation plus) in the error correction/decoder circuit 7, and is further processed for error correction on the basis of product code.

In the error correction/decoder circuit 7, the binary-coded EFD or EFD-plus signal is compared with a reference clock to consequently generate a velocity error signal and a phase error signal, which are then supplied to the drive circuit 6 to control the rotation of the optical disk 1 by the spindle motor 2. Further in the error correction/decoder circuit 7, the pull-in action of a PLL (phase-locked loop) is controlled in accordance with the binary-coded EFD or EFD-plus signal.

The binary data after the error correction is written in the buffer memory 9 at a predetermined transfer rate through the memory controller 8. When data more than a predetermined amount has been stored in the buffer memory 9, the data is read out therefrom at a second transfer rate which is sufficiently lower than the write transfer rate. In this manner, the data is once stored in the buffer memory 9 and then is outputted therefrom as audio data so that, despite occurrence of a trouble where the optical pickup 3 fails to read the data continuously due to a track jump caused by some shock or other disturbance for example, it is still possible to realize a continuous audio data output properly, since the data, corresponding to the time required for resetting the optical head 3 to the former address just prior to the track jump, has already been stored previously in the buffer memory 9.

The operation of the memory controller 8 is under control of the system controller 11. The digital data read out from the buffer memory 9 by the memory controller 8 is converted by the D-A converter 10 into analog audio signals, which are then delivered as a right channel output and a left channel output.

In response to operations of various kinds of keys provided in the operation portion 12, the system controller 11 performs various control actions of transferring various kinds of servo commands to the servo circuit 5, giving an instruction to the memory controller 8 for controlling the buffer memory 9, controlling the display portion 13 to display thereon a play lapse time and character information such as a title of the program being reproduced, or controlling the operations of the spindle servo and the decoder executed in the error correction/decoder circuit 7.

The system controller 11 in this embodiment is provided with a front-end 110. The front-end 110 includes a disk discrimination unit 111 which discriminates a loaded optical disk, an access list acquisition unit 112 which obtains the access list information of the two channel of the HD layer to be reproduced when the optical disk thus discriminated is an optical disk of a hybrid type, a reproduction information setting unit 113 which sets the reproduction information necessary for the reproduction for a designated reproducing area when a reproduction area change request is issued, a reproduction request determining unit 114 which determines whether a reproduction request is issued or not after the reproduction information is set for the designated reproducing area, an access list request unit 115 which requests the access list information of the designated reproducing area when the reproduction request is issued, and a reproduction control unit 116 which, upon issuance of the request for the access list information of the designated reproduction area, obtains the access list information of the designated reproduction area and replaces the access list information of the two-channel by the access list information of the designated channel to start the reproduction from the designated reproduction area.

Figure 3:
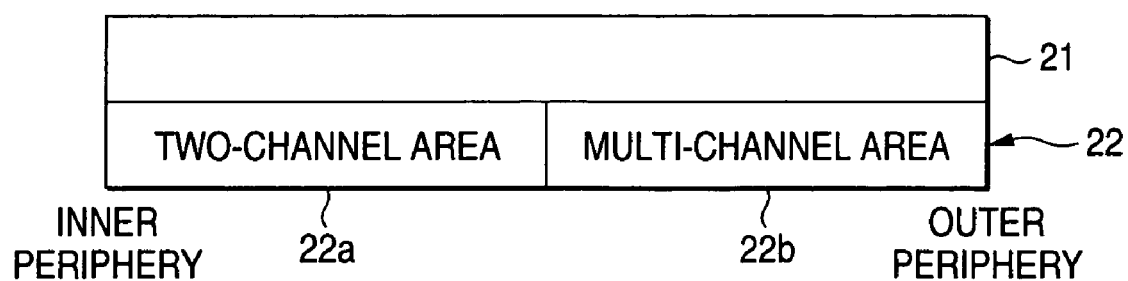
FIG. 3 is a diagram for explaining the area of an SACD which is the optical disk of a hybrid type.

FIG. 2 is a diagram for explaining the structure of an SACD which is an optical disk of a hybrid type used in the embodiment. In FIG. 2, this optical disk consists of a CD layer 21, an HD layer 22, a CD substrate 23, an HD substrate 24, a label plane 25 on the upper surface side and a read plane 26. The HD layer 22 is partitioned in advance into a two-channel area 22a on the inner peripheral side and a multi-channel area 22b as shown in FIG. 3.

The operation of the reproduction area changing process which is the feature of this embodiment will be explained with reference to FIG. 4. First, an optical disk on which information desired to be reproduced is recorded is loaded into the optical disk reproducing apparatus (step S1). When the disk discrimination unit 111 determines that this optical disk is an SACD (step S2), the TOC information of the two-channel and the multi-channel is obtained (step S3). Then, the access list acquisition unit 112 obtains the access list information of the two-channel (step S4) and stores the access list information thus obtained into the buffer memory 9. Then, the reproduction information is set for the two-channel (step S5) and the reproduction is started from the designated track in accordance with the reproduction request from a user (step S6).

When the reproduction area change request (multi-channel change request or CD layer change request) is issued from a user (step S7), a stopping process for stopping the reproduction of the designated tracks of the two-channel is executed (step S8). Then, the reproduction information setting unit 113 sets the reproduction information for the designated reproduction area (for the multi-channel or the CD layer) (step S9) Subsequently, when the reproduction request is issued from a user and the reproduction request determining unit 114 determines that there is the reproduction request (step S10), the access list request unit 115 requests the access list information of the designated reproduction area (the multi-channel or the CD layer) (step S11).

Thus, the reproduction control unit 116 obtains the access list information of the designated reproduction area (the multi-channel or the CD layer) (step S12) and changes the access list information stored in the buffer memory 9 from the access list information of the two-channel to the access list information of the designated reproduction area (the multi-channel or the CD layer) to start the reproduction of the designated reproduction area (the multi-channel or the CD layer) (step S6).

On the other hand, when the reproduction area change request is not issued (step S7), the designated tracks of the two-channel are kept to be reproduced normally. When reproduction of one of the designated tracks is completed (step S13), it is determined whether the one track being reproduced is the last track or not (step S14).

When the one track is not the last track, the track number is incremented by one (step S17) and the next track is reproduced (steps S6, S7 and S13). When the one track being reproduced is the last track (step S14), the reproducing process is stopped (step S15). As a result, the reproduction process is completed (step S16).

What is claimed is:

1. An optical disk reproducing apparatus capable of reproducing a hybrid type optical disk which includes a first recording layer which stores data at a first track pitch and a second recording layer which stores data at a second track pitch which is shorter than the first track pitch, the optical disk reproducing apparatus comprising:
    a memory;
    a selecting section operable to select one of the first recording layer and the second recording layer;
    a setting section operable to set reproduction information for the selected layer;
    an acquiring section operable to acquire an access list of the selected layer from the optical disk and store the acquired access list in the memory; and
    a reproducing section operable to reproduce the data stored in the selected layer based on the set reproduction information and the stored access list,
    wherein when a switch request is issued, the selecting section selects another of the first recording layer and the second recording layer and the setting section sets the reproduction information for the currently selected layer; and
    wherein when a reproduction request is issued after the switch request is issued, the acquiring section acquires an access list of the currently selected layer from the optical disk and stores the currently acquired access list in the memory and the reproducing section reproduces the currently selected layer based on the currently set reproduction information and the currently stored access list.

2. The optical disk reproducing apparatus according to claim 1,
    wherein
    the first recording layer is a Compact Disc layer;
    wherein the second recording layer is a Hi-Definition layer including a two-channel area and a multi-channel area;
    wherein the Compact Disc layer stores a multi-bit digital signal quantized at a first sampling frequency; and
    wherein the two-channel area and the multi-channel area store 1-bit digital signals of two-channel and multi-channel, respectively, which are quantized at a second sampling frequency higher than 0the first sampling frequency.

3. The optical disk reproducing apparatus according to claim 1,
    wherein the access is used for converting time information into address information.

4. The optical disk reproducing apparatus according to claim 1, further comprising
    a disk discriminating section which discriminates an optical disk which has loaded in the optical disk reproducing apparatus and determines whether or not the optical disk is the hybrid type optical disk,
    wherein when the disk discriminating section determines that the optical disk is the hybrid type optical disk, the selecting section automatically selects the one of the first recording layer and the second recording layer, the setting section automatically sets the reproduction information for the selected layer, and the acquiring section automatically acquires the access list of the selected layer from the optical disk and stores the acquired access list in the memory.

5. An optical disk reproducing method for reproducing a hybrid type optical disk which includes a first recording layer which stores data at a first track pitch and a second recording layer which stores data at a second track pitch which is shorter than the first track pitch, the optical disk reproducing method comprising:
    selecting one of the first recording layer and the second recording layer;
    setting reproduction information for the selected layer;
    acquiring an access list of the selected layer from the optical disk and storing the acquired access list in a memory;
    reproducing the data stored in the selected layer based on the set reproduction information and the stored access list;
    when a switch request is issued, selecting another of the first recording layer and the second recording layer and setting the reproduction information for the currently selected layer;
    when a reproduction request is issued after the switch request is issued, acquiring an access list of the currently selected layer from the optical disk, storing the currently acquired access list in the memory and reproducing the currently selected layer based on the currently set reproduction information and the currently stored access list.

6. The optical disk reproducing apparatus according to claim 1,
    wherein when the access list of the currently selected layer is stored in the memory, the access list of the previously selected layer is deleted.

7. The optical disk reproducing method according to claim 5,
    wherein when the access list of the currently selected layer is stored in the memory, the access list of the previously selected layer is deleted.

8. The optical disk reproducing apparatus according to claim 1, wherein when the switch request is issued, the reproducing section stops reproducing the data stored in the previously selected layer.

9. The optical disk reproducing method according to claim 5, further comprising when the switch request is issued, stopping reproducing the data stored in the previously selected layer.

10. The optical disk reproducing apparatus according to claim 1, wherein the reproduction information is information necessary for reproducing the selected layer.

11. The optical disk reproducing method according to claim 5, wherein the reproduction information is information necessary for reproducing the selected layer.

* * * * *